July 11, 1972    A. WINKLER ET AL    3,675,992

PROJECTOR FOR USE WITH CASSETTES FOR MOTION PICTURE FILM

Filed Nov. 25, 1970    6 Sheets-Sheet 1

INVENTOR
ALFRED WINKLER
HERBERT WILSCH
FRIEDRICH WINKLER

United States Patent Office
3,675,992
Patented July 11, 1972

3,675,992
PROJECTOR FOR USE WITH CASSETTES FOR MOTION PICTURE FILM
Alfred Winkler, Munich, and Herbert Wilsch and Friedrich Winkler, Unterhaching, Germany, assignors to Agfa-Gevaert Aktiengesellschaft, Leverkusen, Germany
Filed Nov. 25, 1970, Ser. No. 92,783
Claims priority, application Germany, Dec. 5, 1969,
P 19 61 006.3
Int. Cl. G03b 23/00
U.S. Cl. 352—72
30 Claims

ABSTRACT OF THE DISCLOSURE

The top wall of the housing in a motion picture projector is formed with an inwardly extending chamber for reception of small, medium-sized or large cassettes for convoluted motion picture film. The cassettes are provided with external locating means which facilitate stacking of cassettes during storage or in transport. A plate-like detent member is mounted in the housing adjacent to one side of the chamber and is biased against a cassette in the chamber. The detent member has retaining means which can engage with the locating means of the inserted cassette.

BACKGROUND OF THE INVENTION

The present invention relates to cinematographic apparatus in general, and more particularly to improvements in projectors for use with cassettes which contain convoluted motion picture film. Still more particularly, the invention relates to improvements in motion picture projectors and in cassettes for motion picture film which can be used with such projectors.

It is already known to provide the housing of a projector with retaining devices which can engage and hold specially designed complementary parts provided on the end panels of the cassettes. The cassette is placed onto the housing so that the complementary parts on its end panels engage with the retaining devices. A drawback of such proposal is that the complementary parts on the cassette must be very sturdy and bulky in order to resist shocks and other stresses which are likely to be applied against a properly mounted cassette.

It is also known to provide the housing of a motion picture projector with a retaining device which engages a side panel of the cassette. The retaining device is rather complicated and it also fails to insure safe retention of the cassette in an optimum position during transport of motion picture film from the supply reel in the cassette to a takeup reel or vice versa.

SUMMARY OF THE INVENTION

An object of the invention is to provide a cinematographic apparatus for use with magazines or cassettes for motion picture film wherein a cassette of smallest, medium or maximum size can be safely held in an optimum position when the apparatus is in use and can be rapidly detached to be replaced with a different cassette.

Another object of the invention is to provide a novel cinematographic apparatus which can use presently known stackable cassettes for motion picture film.

A further object of the invention is to provide a motion picture projector with novel means for safely but releasably holding cassettes of different sizes in an optimum position for the projection of images.

An additional object of the invention is to provide a motion picture projector which can be used with presently known stackable cassettes or magazines for motion picture film and which can automatically lock a cassette in an optimum position for projection regardless of whether the cassette contains a short, medium long or very long supply of motion picture film and regardless of whether or not the external configuration of all cassettes is the same.

Still another object of the invention is to provide the projector with novel means for facilitating rapid and effortless detachment of cassettes from the housing of the projector.

An ancillary object of the invention is to provide a motion picture projector wherein a properly inserted cassette need not extend well beyond the outline of the housing so that the inserted cassette is less likely to be subjected to stresses which tend to change its position with reference to the housing.

The invention is embodied in a cinematographic apparatus which comprises a housing having an open chamber which preferably extends inwardly from the top wall of the housing, a cassette containing a supply of convoluted motion picture film and having a casing surrounding the supply of film and including panels at least one of which is provided with one or more grooves, ribs, cutouts, elastic tongues, flaps or analogous locating means cooperating with complementary locating means on another cassette to permit accurate stacking of cassettes during storage or transport, at least a portion of the cassette being received in the chamber of the housing, and a preferably plate-like detent member which is mounted in the housing adjacent to the one panel of the inserted cassette and has a portion which is biased against the one side panel of the inserted cassette. Such portion of the detent member is provided with one or more grooves, cutouts, elastic projections or other types of retaining means capable of engaging with the locating means on the one panel of the inserted cassette to thereby yieldably hold the cassette in an optimum position with reference to the housing. The cassette is preferably insertable into and withdrawable from the chamber in a predetermined direction and the detent member is preferably movable with reference to the housing at right angles to such direction.

An important advantage of the improved cinematographic apparatus is that the retaining means on its detent member can engage and hold such locating means on a panel of the inserted cassette which are provided for the purpose of permitting accurate stacking of cassettes with similarly dimensioned cassettes. Thus, the locating means on the cassettes perform the dual function of cooperating with complementary locating means on adjacent cassettes or of cooperating with the retaining means of the detent member to insure satisfactory retention of the cassette in the chamber of the housing of the cinematographic apparatus.

The novel features which are considered as characteristic of the invention are set forth in particular in the appended claims. The improved cinematographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
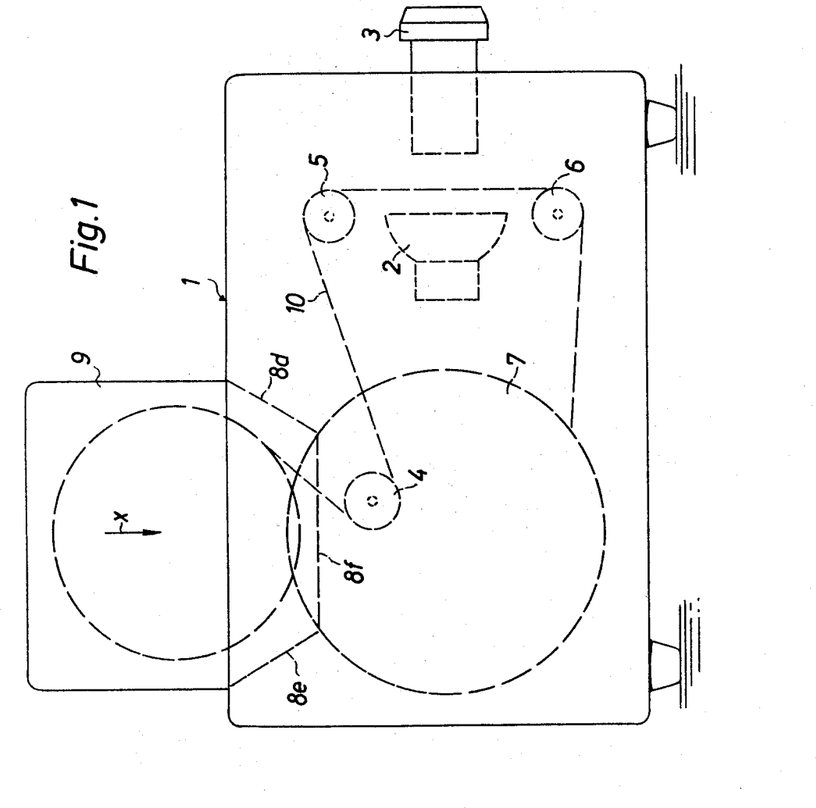
FIG. 1 is a schematic side elevational view of a motion picture projector and of a relatively large cassette which is inserted into the chamber of the projector housing.
Figure 2:
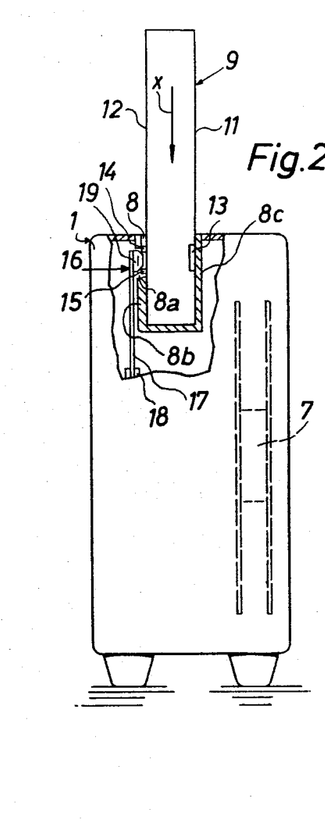
FIG. 2 is an end elevational view of the projector as seen from the left-hand side of FIG. 1, with a portion of the housing broken away.

Referring first to FIGS. 1 and 2, there is shown a motion picture projector having a housing 1 including a front wall which supports a projection lens 3. The light source 2 is located behind the lens 3 and behind a film gate along which the motion picture film 10 is guided from a supply spool or reel in the casing of a detachable magazine or cassette 9 to a takeup reel or spool 7 in or on the housing 1. The housing 1 further supports guide rollers 4, 5 and 6 which define the path for lengthwise travel of film 10 from the cassette 9 to the takeup reel 7.

The top wall of the housing 1 is formed with an open recess or chamber 8 which can receive a portion of the cassette 9. The chamber 8 is surrounded by two side walls 8b, 8c, two inclined end walls 8d, 8e and a horizontal bottom wall 8f of the housing 1.

The cassette 9 is of the type which can be stacked with similar cassettes to occupy little room in storage or during transport. To this end, the cassette 9 comprises two large parallel side panels 11, 12 which are of generally rectangular outline but taper downwardly, as viewed in FIGS. 1 and 2, so as to permit insertion of the cassette 9 all the way to the bottom wall 8f. The cassette of the illustrated size is but one of several differently dimensioned cassettes which can be used in the projector of FIGS. 1 and 2. The side panel 11 is provided with locating means in the form of a transversely extending groove 13 which is at least substantially normal to the direction (arrow X) of insertion of the cassette into the chamber 8 and whose ends communicate with two rectangular locating cutouts or holes (not shown) of the side panel 11. It will be noted that the arrow X is substantially normal to the direction in which the film 10 is being withdrawn from the cassette 9.

The other side panel 12 of the cassette 9 has locating means in the form of two parallel transversely extending rib-shaped projections 14, 15 which are located at the level of the locating groove 13 in the side panel 11. Furthermore, the side panel 12 has two resilient locating tongues or flaps (see the elements 101a in FIG. 9) each of which registers with one of the aforementioned locating cutouts in the side panel 11. When the cassette 9 is to be stacked with a similar cassette, its flaps enter the cutouts of the other cassette and the flaps of a third cassette can enter the cutouts of the illustrated cassette. In this way, the stacked cassettes are held against relative movement laterally of each other. The ribs 14, 15 extend into the groove 13 of the adjacent cassette when the illustrated cassette is stacked with another cassette. Such types of cassettes are available in many sizes, for example, those containing 15, 60 or 120 meters of convoluted motion picture film. It is assumed that the illustrated cassette 9 is the largest of its type and that it is designed to accommodate 120 meters of convoluted roll film. Such largest cassette completely fills the chamber 8 in the top wall of the housing 1. The chamber 8 must be designed in such a way that it can accept and properly locate cassettes of different sizes, and also that a smaller cassette can be inserted and withdrawn with the same facility as a medium-sized or largest cassette.

The bottom wall 8f for the chamber 8 is provided with a customary opening (not shown) which permits entry of a known film threading and winding device (not shown) serving to automatically withdraw the leader of film 10 from the interior of the inserted cassette and to advance such leader lengthwise, for example, into the range of a conventional claw pull-down (not shown) which thereupon transports the film 10 toward the takeup reel 7. The just mentioned device can further serve to convolute the film 10 on the supply reel in the cassette 9.

The detent member for yieldably holding the cassette 9 in the illustrated fully inserted position is denoted by the reference character 16. This detent member is designed to hold in requisite position smallest, medium sized or largest cassettes, and comprises a substantially plate-like leaf spring 17 anchored in the housing 1, as at 18, and carrying at its upper end a preferably cuneiform truncated retaining projection or head 19. The retaining projection 19 can pass through an opening 8a in the side wall 8b of the housing 1 so that its tip enters the space between the locating ribs 14, 15 on the side panel 12 of a properly inserted cassette. During insertion of the cassette 9 in the direction indicated by the arrow X, the retaining projection 19 rides over the lower locating rib 15 and thereupon enters the channel between the ribs 14, 15 to yieldably hold the cassette in the fully inserted position. Since the height of the locating ribs 14, 15 is rather small, and since the retaining projection 19 resembles a truncated wedge which tapers in a direction toward the side wall 8c, the cassette 9 can be readily withdrawn from the chamber 8 by exertion of a pull in a direction counter to that indicated by the arrow X. The operator must overcome the bias of the leaf spring 17 by causing the retaining projection 19 to ride over the lower locating rib 15 while the ribs 14, 15 move upwardly, as viewed in FIG. 2. However, it is equally possible to provide an automatic disengaging device which can separate the detent member 16 from the inserted cassette 9, e.g., upon completion of rewinding of film 10 into the cassette. For example, the bottom wall 8f may be biased upwardly by resilient means (not shown) and cooperates with a pawl or the like which disengages the retaining projection 19 of the spring 17 from the locating ribs 14, 15 when the leader of the film 10 is returned into the interior of the cassette. Such disengaging device than preferably comprises a scanning member or detector which tracks the film and enables the spring-biased bottom wall to actuate the pawl and to thereby disengage the retaining projection 19 from the locating ribs 14, 15 when the rewinding of film onto the supply reel in the cassette 9 is completed.

Figure 3:
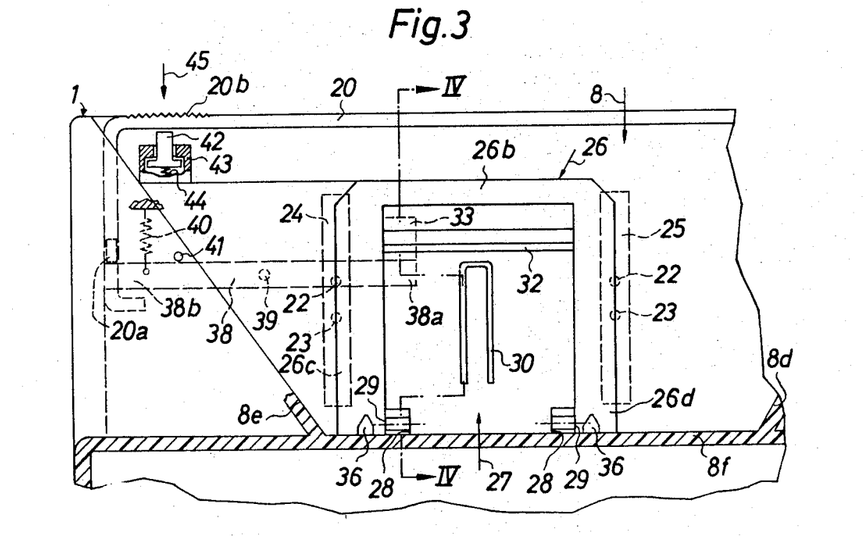
FIG. 3 is a fragmentary longitudinal vertical sectional view of a second projector.
Figure 4:
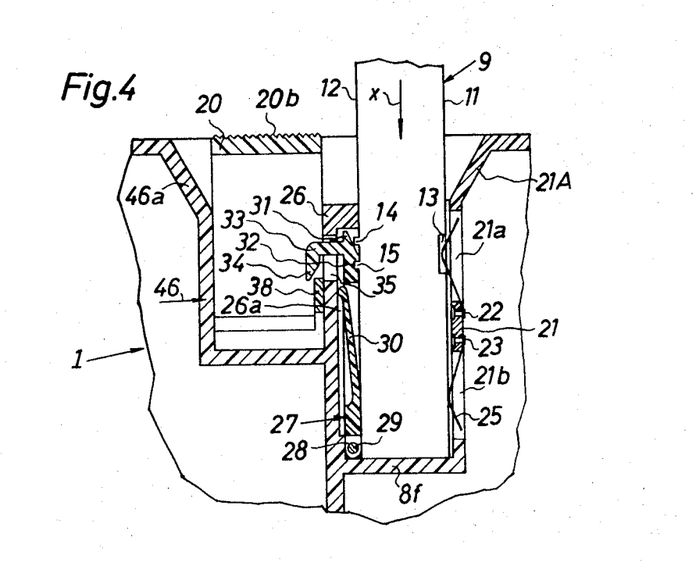
FIG. 4 is a transverse vertical sectional view as seen in the direction of arrows from the line IV—IV of FIG. 3, further showing a portion of a cassette corresponding to that shown in FIGS. 1 and 2.

FIGS. 3 and 4 illustrate a second embodiment of the invention. The housing 1 of the projector has a top wall which is formed with an open recess or chamber 8 flanked at one side by an upright side wall 21 having an outwardly flaring upper end portion 21A and at the other side by an upright frame-like side wall 26. The housing 1 further supports an inverted U-shaped handle 20 which is movable up and down in a space between the wall 26 and a further wall 46. A portion 46a of the wall 46 flares upwardly and outwardly, i.e., away from the chamber 8, to permit convenient insertion of fingers into the space below the web of the handle 20. The plane of the handle 20 is parallel to the plane of the chamber 8. The lower ends of the legs of the inverted U-shaped handle 20 are bent inwardly and/or outwardly and cooperate with suitable stops (not shown) provided in the housing 1 and serving to arrest the handle 20 in its upper and lower end positions. The chamber 8 is further bounded by two downwardly and inwardly inclined end walls 8d, 8e and a horizontal bottom wall 8f. When the handle 20 is maintained in the illustrated concealed or inoperative position, its web is at least substantially flush with the open upper end of the chamber 8. This chamber 8 is dimensioned in such a way that it can accept portions of largest, medium-sized or smallest cassettes and that it insures proper positioning and retention of each cassette when the projector is in use.

The aforementioned side wall 21 of the housing 1 is formed with two parallel vertical cutouts each having two discrete sections 21a, 21b. The bridge between the sections 21a, 21b of each such cutout carries two rivets 22, 23 or analogous fasteners for the median portions of two-armed leaf springs 24, 25 whose arms normally extend through and beyond the respective sections 21a, 21b of the corresponding cutouts so that they bear against the side panel 11 of a cassette 9 while the latter is being introduced into the chamber 8 in the direction indicated by the arrow X. When the cassette 9 is fully inserted into the chamber 8, the upper arms of the leaf springs 24, 25 extend into its groove 13.

The frame-like wall 26 of the housing 1 is provided with a rectangular cutout or opening 26a which imparts to the wall 26 the shape of an inverted U-shaped body having a horizontal top portion or web 26b and two vertical portions or legs 26c, 26d. The detent means for a properly inserted cassette 9 comprises a plate-like detent member 27 having at its lower end eyes 29 for reception of horizontal pintles 28 provided in the housing 1 and serving to permit the detent member 27 to pivot in the opening 26a toward and away from the chamber 8. The common axis of the pintles 28 is at least substantially normal to the direction of insertion of the cassette 9 (arrow X). The detent member 27 preferably consists of suitable synthetic plastic material and is preferably integral with a U-shaped plastic spring 30 which bears against the adjacent portion of the wall 26 and tends to bias the upper portion of the member 27 into the chamber 8, i.e., toward the wall 21. The detent member 27 is further provided with an inclined cam face 31 and a horizontal retaining groove 32 for reception of the locating rib 14 or 15 on the side panel 12 of a cassette 9. Still further, the detent member 27 has a hooked projection 33 provided with an inclined cam face 34 and extending through an opening 35 of the wall 26.

The bottom wall 8f of the housing 1 is formed with upwardly extending retaining protuberances in the form of teeth 36 each of which can enter a complementary locating notch (not shown) provided in the bottom panel of the properly inserted cassette 9. The retaining teeth 36 are in line with the lower end portions of the legs 26c, 26d of the frame-like wall 26. The locating notches in the bottom panel of the cassette 9 are adjacent to the opening through which the film 10 is being drawn off the supply reel.

FIG. 3 shows that the wall 26 is not located exactly midway between the end walls 8d, 8f of the housing 1; this wall 26 is nearer to the wall 8e. The height of the wall 26 is selected in such a way that, when a smallest cassette 9 is being introduced into the chamber 8 by sliding along the end wall 8e, one of the aforementioned locating notches in the bottom panel of the cassette receives the left-hand retaining tooth 36, as viewed in FIG. 3, after one of the aforementioned resilient locating flaps of the smallest cassette engages and moves along the top edge face of the horizontal portion 26b of the wall 26. Thus, before the left-hand retaining tooth 36 enters the corresponding locating notch of the cassette 9, the aforementioned locating flap slides for a while along the top edge face of the portion 26b. The distance between the outer edge faces of the vertical wall portions 26c, 26d corresponds to the distance between the locating flaps of a cassette so that the left-hand retaining tooth 36 enters the addjacent locating notch only when the locating flaps of the cassette 9 flank the wall portions 26c, 26d. This insures that even the smallest cassette is held in an optimum position for withdrawal of film 10 from its supply reel. The mode of insertion is anologous when the smallest cassette is being introduced into the chamber 8 by sliding along the right-hand end wall 8d. The left-hand locating flap of the cassette then slides along the top edge face of the horizontal wall portion 26b until one or both locating notches in the bottom panel of the cassette register with the retaining teeth 36; the cassette is then free to descend so that its notches receive the teeth 36 and its locating flaps flank the vertical portions 26c, 26d of the wall 26. When the chamber 8 is to receive a portion of a largest cassette 9 (for example, a cassette containing 120 meters of convoluted motion picture film), the cassette is guided by both end walls 8d, 8e of the housing 1 (see FIG. 1).

When the bottom panel of a properly inserted cassette 9 reaches the bottom wall 8f, the retaining groove 32 of the detent member 27 receives the locating rib 15 on the side panel 12 to thereby releasably hold the cassette against accidental extraction from the chamber 8. The upper arms of the springs 24, 25 then extend into the locating groove 13 of the inserted cassette and the lower arms of such springs urge the cassette 9 against the portions 26b–26d of the frame-like wall 26.

The disengaging means for the detent member 27 of FIGS. 3 and 4 receives motion from the handle 20. When the handle 20 is moved upwardly to its extracted position, it can be conveniently grasped by four fingers of one hand to facilitate transportation of the projector. Once the projector is placed into storage or into requisite position for use, the handle 20 can be depressed to reassume the position shown in FIG. 3. In such position, the underside of the horizontal web of the handle 20 is immediately or closely adjacent to a post or knob 42 which is mounted in a socket 43 of the housing 1 and is biased upwardly by a helical spring 44. The disengaging means for the detent member 27 comprises a two-armed disengaging lever 38 which is fulcrumed in the housing 1, as at 39, and one arm (38a) of which is normally located below the cam face 34 of the projection 33 on the detent member. A helical spring 40 is attached to the arm 38b of the lever 38 and tends to pivot the disengaging lever in a clockwise direction, as viewed in FIG. 3, so that the arm 38b bears against a fixed stop post 41 of the housing 1 and the arms 38a is located at a level below and is disengaged from the projection 33 of the detent member 27. The left-hand leg of the handle 20 has a horizontal motion transmitting extension 20a which can be moved downwardly to thereby pivot the disengaging lever 38 in a counterclockwise direction and to thus disengage the retaining groove 32 in the projection 33 from the locating rib 15 of the inserted cassette 9. The cassette is thereupon ready to be withdrawn from the chamber 8 by overcoming the resistance of the leaf springs 24, 25. The knob 42 and its spring 44 maintain the handle 20 in an intermediate position which is preferably close to the fully concealed position. The direction in which the user must press the handle 20 in order to pivot the disengaging lever 38 in a counterclockwise direction is indicated by an arrow 45. The upper side of the web of the handle 20 is preferably provided with a symbol or other identifying means to enable the operator to rapidly locate that portion which must be depressed in order to disengage the retaining groove 32 of the detent member 27 from the locating rib 15 on the side panel 12 of the inserted casssette 9. In the embodiment of FIGS. 3 and 4, such indicating or identifying means comprises a knurled or milled portion 20b of the handle 20. During anticlockwise pivoting of the disengaging lever 38, the arm 38a engages and slides along the cam face 34 of the projection 33 and thereby pulls the projection 33 away from the side wall 21. The outwardly tapering upper portion 21A of the wall 21 serves to facilitate the introduction of a cassette 9 into the chamber 8.

Figure 5:
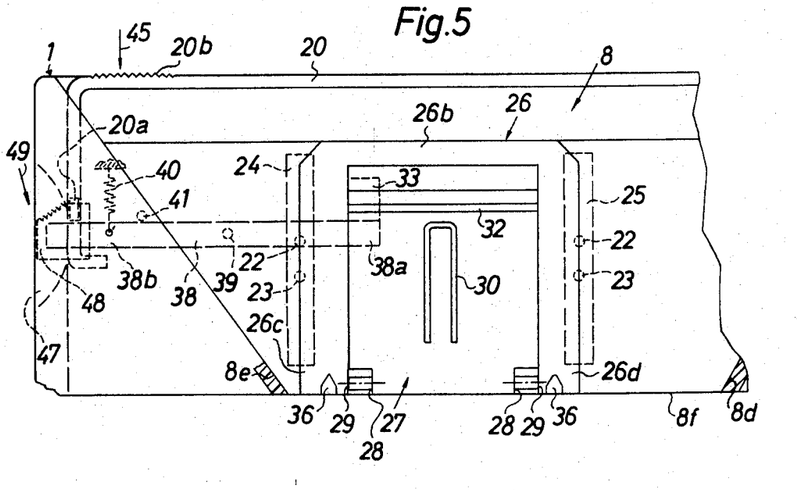
FIG. 5 is a fragmentary sectional view similar to that shown in FIG. 3 but illustrating a modified device for disengaging the retaining means of the detent member in the projector housing from the locating means of an inserted cassette.

FIG. 5 illustrates a modified disengaging device which embodies the entire disengaging structure of FIGS. 3–4 and further comprises means for directly pivoting the disengaging lever 38 in a counterclockwise direction, i.e., not through the intermediary of the handle 20. The arm 38b is somewhat longer than shown in FIG. 3 and has a knurled or milled knob 48 which can be reached in a recess 47 of the housing 1. When the knob 48 is depressed by hand in the direction indicated by the arrow 49, the lever 38 is pivoted in a counterclockwise direction and its arm 38a disengages the retaining groove 32 in the projection 33 from the locating rib 15 on the side panel 12 of a cassette in the chamber 8. The housing 1 is provided with a suitable slot (not shown) through which the arm 38b extends into the recess 47.

Figure 6:
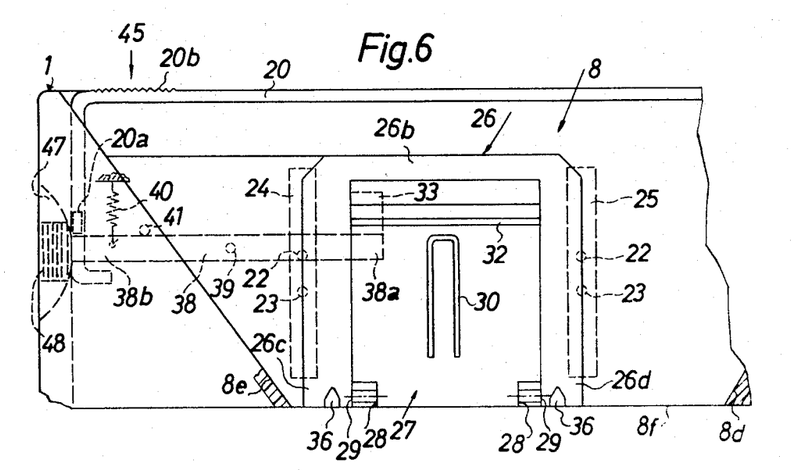
FIG. 6 illustrates a modification of the structure shown in FIG. 5.

FIG. 6 shows a slight modification of the structure of FIG. 5. The disengaging lever 38 is not only pivotable but is also movable by hand to a limited extent with reference to and axially of the fulcrum means 39. By exerting a pressure on the knob 48 in a direction at right angles to the plane of FIG. 6, the disengaging lever 38 is shifted axially of the fulcrum means 39 and its arm 38a thereby disengages the retaining groove 32 in the projection 33 from the locating rib 15 on the side panel 12 of a cassette in the chamber 8. The disengaging lever 38 pivots on the fulcrum means 39 in response to complete depression of the handle 20, and such pivoting of the lever 38 again causes the arm 38a to disengage the retaining groove 32 of the projection 33 from a locating rib 15.

Figure 7:
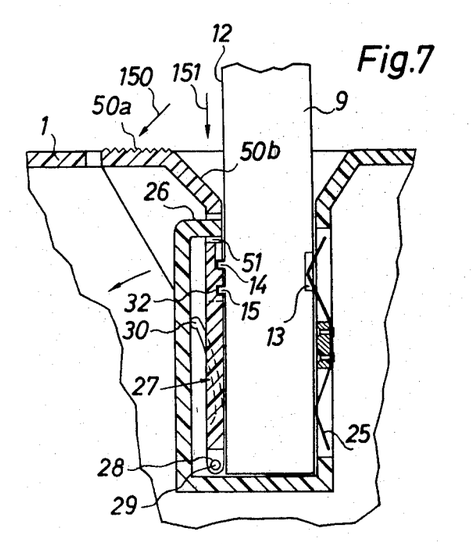
FIG. 7 is a fragmentary transverse sectional view of a further projector wherein the disengaging means for the retaining means is integral with the detent member.
Figure 8:
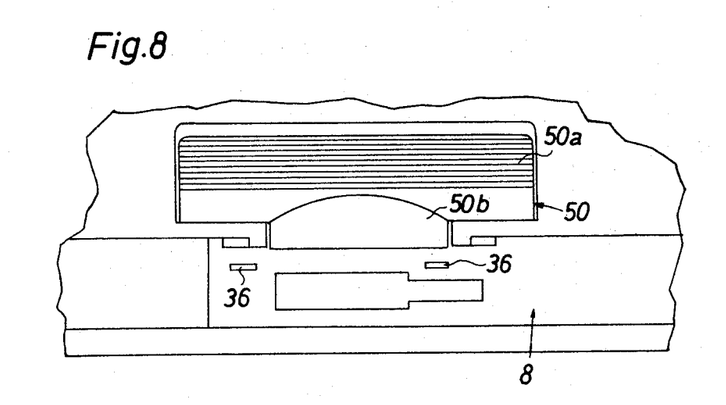
FIG. 8 is a plan view of the structure shown in FIG. 7.

Referring to FIGS. 7 and 8, the housing 1 of the projector is constructed in the same way as shown in FIGS. 3–6. However, the disengaging means is integral with or rigidly connected to the detent means. The detent means includes a plate-like detent member 27 with eyes 29 for pintles 28 and a spring 30 which biases the upper portion of the member 27 against the side panel 12 of a cassette 9 in the chamber 8 so that the locating rib 15 of the cassette extends into a complementary retaining groove 32 of the detent member. The disengaging means comprises a disengaging lever 50 which is integral with the upper end portion of the detent member 27 and has a knurled or milled portion 50a which can be depressed by a finger in the direction indicated by arrow 150 to thereby move the retaining groove 32 away from the locating rib 15. By overcoming the resistance of the springs 24 and 25 (only the spring 25 shown), the user can withdraw the cassette 9 from the chamber 8. The housing 1 has an opening to afford access to the milled portion 50a.

The disengaging lever 50 is further provided with an arcuate portion 50b having a concave surface facing the adjacent portion of the cassette 9. By inserting one or more fingers into the portion 50b and by applying a pressure in the direction indicated by the arrow 151, the user can pivot the detent member 27 against the opposition of the spring 30 to thereby move the retaining groove 32 away from the locating rib 15. The frame-like wall 26 has a portion which extends through a cutout 51 in the upper portion of the detent member 27.

Figure 9:
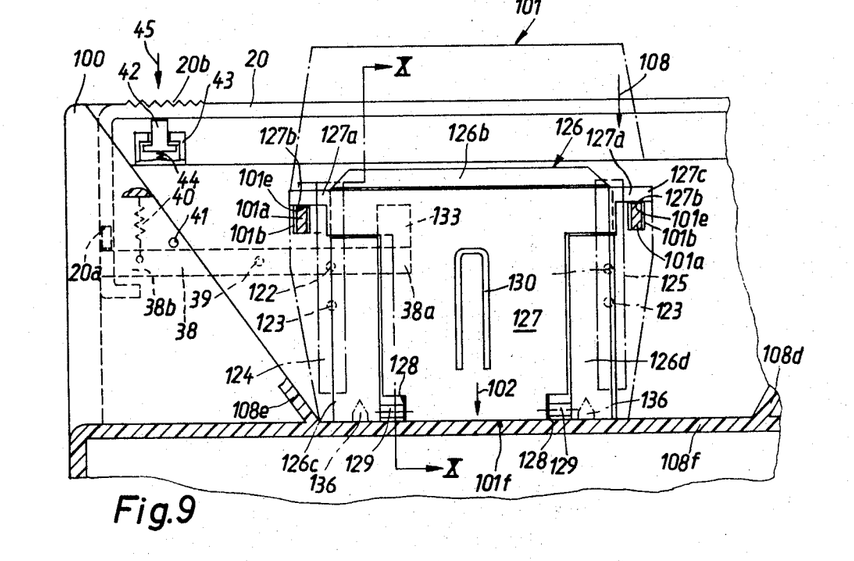
FIG. 9 is a fragmentary longitudinal vertical sectional view of still another projector.
Figure 10:
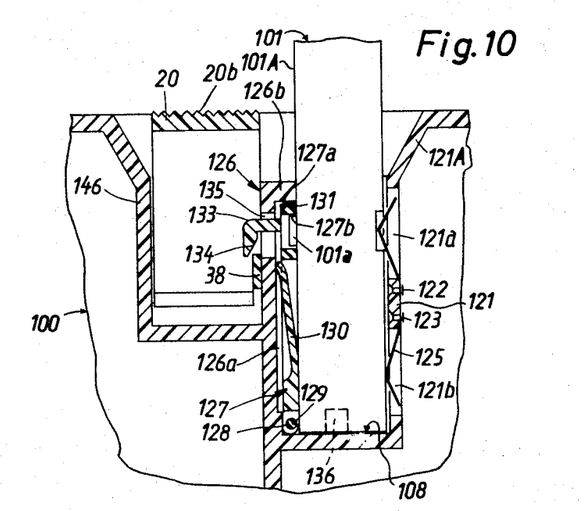
FIG. 10 is a transverse vertical sectional view as seen in the direction of arrows from the line X—X of FIG. 9.
Figure 11:
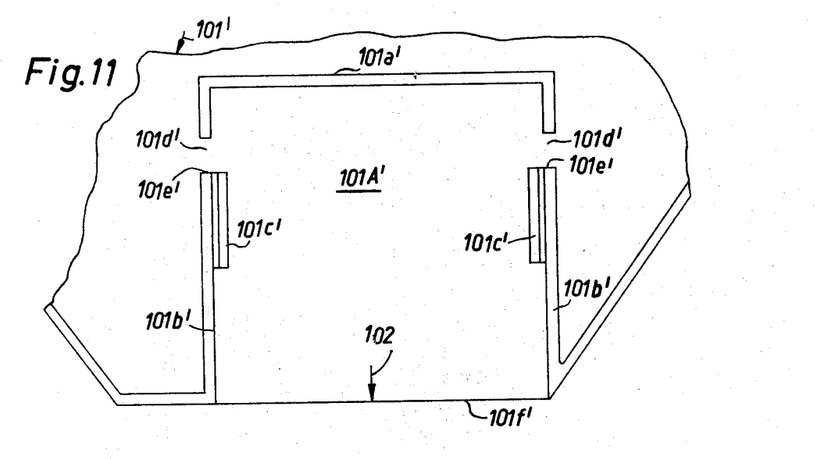
FIG. 11 is a fragmentary side elevational view of a relatively large cassette which can be utilized in the projector of FIGS. 9 and 10.

FIGS. 9 and 10 illustrate a further projector having a housing 100 provided with an open chamber 108 serving to receive relatively small cassettes 101 (FIGS. 9, 10 and 12) or larger cassettes 101' (FIG. 11). Each cassette comprises a casing surrounding a rotary supply reel for convoluted motion picture film. The projector housing 100 does not have a spindle for the supply reel of the inserted cassette 101 or 101'. As mentioned above, cassettes of the type adapted to be used in the projector of the present invention are available in many sizes, such as those for 15, 60 or 120 meters of motion picture film. It is assumed that the cassette 101 contains 15 meters and that the cassette 101' contains 120 meters of film.

The cassette 101 is constructed in such a way that it can be readily stacked with similar cassettes. To this end, the cassette 101 comprises a side panel 101A having two elastic locating flaps 101a which extend outwardly through openings or cutouts 101b provided in the side panel 101A (see FIGS. 9 and 10). Two parallel locating ribs 101c (FIG. 12) extend across the side panel 101A between the locating flaps 101a. The other side panel of the cassette 101 has two locating recesses (not shown) which are aligned with the locating flaps 101a and a locating groove which extends between such recesses and is aligned with the locating ribs 101c. If the illustrated cassette 101 is to be stacked with one or more similar cassettes, the locating ribs 101c of the illustrated cassette 101 enter the aforementioned groove of a second cassette and the locating flaps 101a of the illustrated cassette enter the recesses of the second cassette. This insures that the two cassettes are properly stacked against lateral movement with reference to each other. The arrow 102 indicates in FIG. 9 the general direction in which the cassette 101 is to be inserted or withdrawn from the chamber 108. This arrow further indicates the general direction in which the film is being drawn from the properly inserted cassette 101. The bottom panel of the cassette 101 has a customary opening (not shown) through which the film threading and winding device can enter to engage the outermost convolution of film and to cause the leader to advance along a predetermined path toward the takeup reel, not shown.

FIG. 11 illustrates a portion of a large cassette 101', for example, a cassette for storage of 120 meters of motion picture film. The arrow 102 again indicates the direction in which the cassette 101' must be inserted into or withdrawn from the chamber 108 of the projector housing 100 shown in FIGS. 9 and 10. The end panels of the casing of the cassette 101' taper downwardly so that they can abut against the end wall 108d, 108e in the housing 100. The illustrated side panel 101A' of the cassette 101' of FIG. 11 is provided with a substantially U-shaped locating frame which is open in the direction of insertion of the cassette into the chamber 108 and includes a transversely extending horizontal strip 101a' and two parallel vertical strips 101b'. The side panel 101A' is further provided with two locating groove 101c' each of which is inwardly adjacent to one of the strips 101b'. The strips 101b' are formed with notches 101d' and have locating shoulders or end faces 101e' each flanking the lower end of one of the notches 101d'. The distance between the plane of the shoulders 101e' and the bottom surface 101f' of the cassette 101' equals the distance between the bottom surface 101f and the upper edge faces or shoulders 101e of locating flaps 101a on the side panel 101A of the smaller cassette 101.

The dimensions of the chamber 108 shown in FIGS. 9 and 10 are selected in such a way that this chamber can snugly receive the lower portion of the largest cassette 101'. At the same time, the chamber 108 can properly receive and locate a medium-sized cassette or a smallest cassette 101 upon withdrawal of the cassette 101'. The chamber 108 is flanked by a first side wall 121, a frame-like second side wall 126, the aforementioned end walls 108d, 108e, and a bottom wall 108f. The bottom wall 108f has a suitable opening (not shown) which permits introduction of the aforementioned film threading and winding device through the opening in the bottom surface 101f of the cassette 101 in order to withdraw the leader of the film and to advance the leader toward the takeup reel. The side wall 121 has two vertically extending cutouts each having two elongated slot-shaped sections 121a, 121b for the arms of two-armed leaf springs 124, 125 which are secured to the side wall 121 by rivets 122, 123 or analogous fasteners. The upper portion 121A of the side wall 121 flares outwardly and upwardly to facilitate the introduction of cassettes into the chamber 108.

The frame-like wall 126 defines with a third wall 146 of the housing 100 a space for an inverted U-shaped handle 20 which is mounted in the same way as described in connection with FIGS. 3 and 4. Stops which are provided in the housing 100 serve to locate the handle 20 in its upper and lower end positions. The wall 126 has a substantially rectangular opening or cutout 126a which forms a horizontal top guide portion 126b and two vertical guide portions or legs 126c, 126d. The opening 126a accommodates a plate-like detent member 127 which is analogous to the detent member 27 of FIGS. 3 and 4. The lower portion of the member 127 has two coaxial eyes 128 for pintles 129 which are mounted in the housing 100. This detent member preferably consists of synthetic plastic material and has a preferably integral spring 130 which biases its upper portion toward the interior of the chamber 108, i.e., against the adjacent side panel 101A of the inserted cassette 101. The hooked projection 133 of the detent member 127 has an inclined cam face 131 which enables the bottom part of a cassette 101 or 101' to slide thereover in a direction (arrow 102) toward the bottom wall 108f. The projection 133 extends through an opening 135 of the wall 126 and is provided with a second inclined cam face 134 which can be engaged by the arm 38a of the two-armed disengaging lever 38.

The bottom wall 108f is provided with two retaining protuberances or teeth 136 which can be received in locating notches provided in the bottom panel of the cassette 101 or 101'. The teeth 136 are in line with the guide portions or legs 126c, 126d of the wall 126. The locating notches in the bottom panel of the cassette 101 or 101' flank the opening through which the film is being withdrawn.

FIG. 9 shows that the detent member 127 is a substantially T-shaped plate having a vertically extending central section and two arms 127a which extend outwardly beyond the legs 126c, 126d of the wall 126. The distance between the tips of the arms 127a slightly exceeds the distance between the elastic locating flaps 101a of the smallest cassette 101 or the distance between the vertical locating strips 101b' of the largest cassette 101'. The arms 127a are provided with retaining shoulders 127b. FIG. 9 further shows that the frame-like wall 126 is not located midway between the end walls 108d, 108e. The height of the wall 126 is such that, when the smallest cassette 101 is being introduced into the chamber 108 and slides along the end wall 108e, one of the locating flaps 101a on the cassette 101 slides along and is guided by the upper edge of the top wall portion 126b and such flap thereupon slides along the outer edge of the vertical guide portion or leg 126d before the locating notches in the bottom panel of the cassette 101 can reach and receive the retaining teeth 136. The distance between the legs 126c, 126d of the wall 126 equals the distance between the locating flaps 101a of the cassette 101.

The mode of introduction of the cassette 101 is analogous when the cassette is being introduced into the chamber 108 while sliding along the right-hand end wall 108d of FIG. 9. One of the locating flaps 101a slides along and is guided by the upper edge of the top portion 126b and thereupon slides along the outer edge of the leg 126e before the locating notches in the bottom panel of the cassette 101 move into registry with and receive the retaining teeth 136 on the bottom wall 108f. The largest cassette 101' is guided by both end walls 108d, 108e.

Once the smallest cassette 101 is properly introduced into and located in the chamber 108, the retaining shoulders 127b of the arms 127a on the detent member 127 engage the upper edge faces or shoulders 101e of the locating flaps 101a to complete the attachment of the cassette 101 to the housing 100. The arms of the leaf springs 124, 125 enter the adjacent sections 121a, 121b of cutouts in the wall 121 whereby the upper arms of such springs enter the adjacent groove in the side panel on the cassette 101 and the lower arms of such springs urge the cassette against the portions 126b–126d of the wall 126. The springs 124, 125 insure that the cassette 101 is held in the chamber 108 in an optimum position for withdrawal of film from its supply reel.

When the smaller cassette 101 is replaced with the largest cassette 101', the retaining shoulders 127b of the arms 127a on the detent member 127 engage the locating shoulders 101e' of the strips 101b' to insure satisfactory retention of the largest cassette in the housing 100. The upper parts of the arms 127a are provided with inclined surfaces 127c which allow for practically unimpeded introduction of cassettes 101 or 101' or medium-sized cassettes into the chamber 108.

The disengaging means for the plate-like detent member 127 is analogous to the disengaging means of FIGS. 3 and 4. The aforementioned disengaging lever 38 is fulcrumed in the housing 100, as at 39, and its arm 38b is located at a level below a nob 42 which is received in a socket 43 and is biased upwardly by a helical spring 44. When the handle 20 is depressed beyond the illustrated position, for example, by applying pressure against its knurled or milled portion 20b in the direction indicated by the arrow 45, the motion transmitting extension 20a pivots the arm 38b in a counterclockwise direction against the opposition of the spring 40 whereby the arm 38a engages the cam face 134 and moves the projection 133 away from the wall 121 to thus disengage the detent member 127 from the inserted cassette 101. The operator is then free to withdraw the cassette by overcoming the opposition of leaf springs 124, 125. When the pressure upon the portion 20b of the handle 20 is terminated, the spring 44 expands and moves the handle 20 back to the illustrated position. The spring 40 is then free to contract and pivots the lever 38 in a clockwise direction so as to move the arm 38a away from the cam face 134 on the projection 133. The spring 130 is then free to return the upper portion of the detent member 127 into the chamber 108. The largest cassette 101' is disengaged from the detent member 127 in the same way as the cassette 101.

Figure 12:
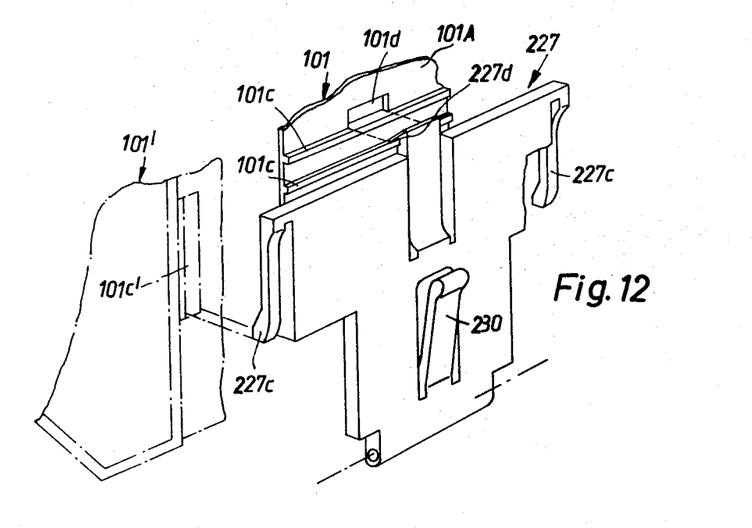
FIG. 12 is a perspective view of a modified detent member which can properly retain cassettes of the type shown in FIG. 11 or cassettes of the type shown in FIGS. 9 and 10.

FIG. 12 illustrates a further plate-like detent member 227 which constitutes a modification of the detent member 127 shown in FIGS. 9 and 10. The detent member 227 is provided with a retaining projection or tongue 227d which can be received in a locating cutout or opening 101d in the side panel 101A of the smallest cassette 101. The detent member 227 further comprises a spring 230 which biases its upper portion into the interior of the chamber, not shown. A largest cassette 101' can be retained by two additional retaining projections or tongues 227c which can enter the locating grooves 101c' of the cassette 101'. The retaining tongues 227c, 227d are movable in directions at right angles to the general plane of the detent member 227, i.e., at right angles to the direction of insertion of cassettes 101, 101'. This insures that the centrally located retaining tongue 227d can yield during insertion of the largest casette 101' and that the retaining tongues 227c can yield during insertion of the smallest cassette 101.

The disengaging means (not shown) for the detent member 227 of FIG. 12 can be actuated in the same way as described above, for example, by way of a handle corresponding to the member 20 of FIG. 3.

The detent member 227 of FIG. 12 can be modified without departing from the spirit of our invention. For example, the retaining tongues 227c can be replaced with or provided in addition to a preferably wedge-like retaining projection (not shown) which can engage the locating strip 101a' on the side panel 101A' of the largest cassette 101'. The wedge-like projection is employed when the vertical strips 101b' of the cassette 101' are not provided with notches 101d'.

It is further within the purview of the invention to provide one side panel of each cassette with two locating cutouts or openings which are placed at a predetermined distance from each other, regardless of the size of the cassette, and which are further disposed at a predetermined distance from the bottom surface of the respective cassette, such as the bottom surfaces 101f, 101f' of the cassettes 101, 101'. The detent member then comprises two elastic retaining flaps or analogous projections which enter the locating openings of the inserted cassette and yieldably hold the cassette in an optimum position irrespective of the size of the inserted cassette. The locating means on a medium-sized cassette can correspond to the locating means of the cassette 101 or 101'.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

1. In a cinematographic apparatus, a combination comprising a housing having an open chamber; a casette containing a supply of convoluted motion picture film and having panels and locating means provided on said panels to promote accurate stacking of the cassette with similar cassettes by engaging with the locating means on the panels of adjoining cassettes in a stack, at least a portion of said cassette being received in said chamber; and a detent member mounted in said housing adjacent to one panel of said cassette, at least a portion of said detent member being biased against one said panel and having retaining means engaging the locating means on said one panel to thereby yieldably hold the cassette in a predetermined position with reference to the housing.

2. A combination as defined in claim 1, wherein said cassette is insertable into and withdrawable from said chamber in a predetermined direction and said portion of said detent member is movable with reference to said housing substantially at right angles to said predetermined direction.

3. A combination as defined in claim 1, wherein said detent member comprises a substantially plate-like body.

4. A combination as defined in claim 1, wherein said housing comprises a first side wall adjacent to one side of said chamber and a frame-like second side wall adjacent to another side of said chamber opposite said first side wall, said detent member being mounted in said second side wall.

5. A combination as defined in claim 4, wherein said second side wall has at least one opening through which said portion of said detent member extends into engagement with the locating means of said one panel.

6. A combination as defined in claim 1, wherein said one panel is a side panel of said cassette and said locating means comprises a plurality of elastic elements extending outwardly through openings provided in said side panel, said retaining means comprising shoulders provided on said detent member and engaging said elastic elements to thus releasably hold the cassette in said chamber.

7. A combination as defined in claim 1, wherein said one panel is a side panel of said cassette and said locating means comprises a frame provided on said side panel, said cassette being insertable into and withdrawable from said chamber in a predetermined direction and said frame having a pair of elongated strip-shaped portions parallel to said direction and having transversely extending shoulders, said retaining means comprising complementary shoulders provided on said detent member and engaging the shoulders of said strip-shaped portions to thereby releasably hold the cassette in said chamber.

8. A combination as defined in claim 1, wherein said one panel is a side panel of said cassette and said locating means comprises a frame provided on said side panel, said cassette being insertable into and withdrawable from said chamber in a predetermined direction and said frame having a portion extending substantially at right angles to such direction, said retaining means comprising a projection which overlies said frame portion to thereby releasably hold the cassette in said chamber.

9. A combination as defined in claim 1, further comprising disengaging means operable to disengage said retaining means from the locating means on said one panel of the cassette in said chamber.

10. A combination as defined in claim 9, further comprising a handle mounted in said housing for movement to and from a predetermined position, said disengaging means comprising a disengaging member arranged to disengage said retaining means from the locating means of the cassette in said chamber in response to movement of said handle to said predetermined position.

11. A combination as defined in claim 10, wherein said disengaging member is a lever which is pivotably mounted in said housing.

12. A combination as defined in claim 11, wherein said lever has an arm which directly engages said detent member to move said retaining means away from engagement with the locating means on said one panel of the cassette in said chamber in response to movement of said handle to said predetermined position.

13. A combination as defined in claim 10, wherein said handle is provided with identifying means for that portion thereof to which a manually exerted force is to be applied in order to move the handle to said predetermined position.

14. A combination as defined in claim 9, wherein said disengaging means comprises a manually movable disengaging member which is rigid with said detent member.

15. A combination as defined in claim 14, wherein said detent member is pivotable to move said retaining means into and away from engagement with the locating means on said one panel of the cassette in said chamber, said disengaging member constituting a lever which is integral with said detent member and is accessible by way of an opening in said housing.

16. A combination as defined in claim 1, wherein said one panel is a side panel of said cassette and said locating means comprises a cutout provided in said side panel, said retaining means comprising a resilient projection provided on said portion of said detent member and extending into said cutout.

17. A combination as defined in claim 16, wherein said cassette is insertable into and withdrawable from said chamber in a predetermined direction and said locating means further comprises a pair of parallel ribs provided on said side panel and making an angle of about 90 degrees with said predetermined direction.

18. A combination as defined in claim 16, wherein said cassette fills only a portion of said chamber and said resilient projection is movable with reference to the remaining part of said detent member substantially at right angles to the direction in which the cassette is insertable into and withdrawable from said chamber.

19. A combination as defined in claim 1, wherein said one panel is a side panel of said cassette and said locating means comprises a pair of cutouts provided in said side panel, said retaining means comprising a pair of projections provided on said retaining member and extending into said cutouts.

20. A combination as defined in claim 1, wherein said housing comprises a substantially upright frame-like wall adjacent to one side of said chamber and said detent member is mounted in said wall, said portion of said detent member being movable between a first position in which it is nearer to said chamber and a second position in which it is at least substantially concealed in said wall.

21. A combination as defined in claim 1, wherein said housing comprises a first wall adjacent to one side of said chamber and a second wall adjacent to another side of said chamber opposite said first wall, said detent member being mounted in said second wall and further comprising resilient means mounted on said first wall to bias a cassette in said chamber against said second wall.

22. A combination as defined in claim 1, wherein said housing comprises a wall adjacent to one side of said chamber and supporting said detent member, said wall having guide means for guiding the cassette during introduction into said chamber.

23. A combination as defined in claim 22, wherein said cassette fills only a portion of said chamber and is interchangeable with larger cassettes which can fill the entire chamber.

24. A combination as defined in claim 22, wherein said guide means includes a pair of spaced legs forming part of said wall and extending in parallelism with the direction in which the cassette is insertable into and withdrawable from said chamber, said locating means comprising a pair of elastic elements provided on said one panel and each engaging one of said legs in the inserted position of said cassette.

25. In a cinematographic apparatus, a combination comprising a housing having an open chamber; a cassette containing a supply of convoluted motion picture film and having panels and locating means provided on said panels to permit accurate stacking of the cassette with similar cassettes, at least a portion of said cassette being received in said chamber; and a detent member mounted in said housing adjacent to one panel of said cassette, at least a portion of said detent member being biased against said one panel and having retaining means engaging the locating means on said one panel to thereby yieldably hold the cassette in a predetermined position with reference to the housing, the locating means of said one panel comprising a pair of substantially parallel rib-shaped projections and the retaining means of said detent member comprising a third projection which extends between said rib-shaped projections.

26. A combination as defined in claim 25, wherein said cassette is insertable into and withdrawable from said chamber in a predetermined direction and said rib-shaped projections are at least substantially normal to such direction, said third projection constituting a truncated wedge.

27. In a cinematographic apparatus, a combination comprising a housing having an open chamber; a cassette containing a supply of convoluted motion picture film and having panels and locating means provided on said panels to permit accurate stacking of the cassette with similar cassettes, at least a portion of said cassette being received in said chamber and said cassette being insertable into and withdrawable from said chamber in a predetermined direction; and a detent member mounted in said housing adjacent to one panel of said cassette, at least a portion of said detent member being biased against said one panel and having retaining means engaging the locating means on said one panel to thereby yieldably hold the cassette in a predetermined position with reference to said housing, the locating means on said one panel comprising at least one rib-shaped projecttion which is at least substantially normal to said direction, said retaining means comprising a groove provided on said portion of said detent member and receiving said projection.

28. In a cinematographic apparatus, a combination comprising a housing having an open chamber; a cassette containing a supply of convoluted motion picture film and having panels and locating means provided on said panels to permit accurate stacking of the cassette with similar cassettes, at least a portion of said cassette being received in said chamber and said cassette being insertable into and withdrawable from said chamber in a predetermined direction; and a detent member mounted in said housing adjacent to one panel of said cassette, at least a portion of said detent member being biased against said one panel and having retaining means engaging the locating means on said one panel to thereby yieldably hold the cassette in a predetermined position with reference to said housing, said one panel constituting a side panel of said cassette and said locating means comprising a frame provided on said side panel, said frame comprising a first portion which is at least substantially normal to said direction and two elongated strip-shaped portions which are parallel to said direction, said locating means further comprising a pair of elongated grooves each adjacent to and parallel to one of said strip-shaped portions and each of said strip-shaped portions having a tranvsersely extending shoulder, said retaining means comprising complementary shoulders provided on said detent member and engaging the shoulers of said strip-shaped portions, and elastic tongues extending into said grooves.

29. In a cinematographic apparatus, in a combination comprising a housing having an open chamber; a cassette containing a supply of convoluted motion picture film and having panels and locating means provided on said panels to permit accurate stacking of the cassette with similar cassettes, at least a portion of said cassette being received in said chamber and said cassette being insertable into and withdrawable from said chamber in a predetermined direction; and a detent member mounted in said housing adjacent to one panel of said cassette, at least a portion of said detent member being biased against said one panel and having retaining means engaging the locating means on said one panel to thereby yieldably hold the cassette in a predetermined position with reference to said housing, said one panel constituting a side panel of said cassette and said locating means comprising a pair of elongated grooves provided in said side panel and parallel to said direction, said retaining means comprising a pair of elastic projections provided on said detent member and extending into said grooves, said projections being movable with reference to the remaining part of said detent member substantially at right angles to said directions.

30. In a cinematographic apparatus, a combination comprising a housing having an open chamber; a cassette containing a supply of convoluted motion picture film and having panels and locating means provided on said panels to permit accurate stacking of the cassette with similar cassettes, at least a portion of said cassette being received in said chamber; and a detent member mounted in said housing adjacent to one panel of said cassette, at least a portion of said detent member being biased against said one panel and having retaining means engaging the locating means on said one panel to thereby yieldably hold the cassette in a predetermined position with reference to said housing, said housing comprising a wall adjacent to one side of said chamber and supporting said detent member, said wall having guide means for guiding the cassette during introduction into said chamber, said wall constituting a U-shaped body having a web and two parallel legs and said guide means including the web of said wall.

References Cited

UNITED STATES PATENTS

| 3,227,508 | 1/1966 | Bavaro | 352—72 |
| 3,499,376 | 3/1970 | Swift | 95—31 |
| 3,583,655 | 6/1971 | Roman | 352—72 |
| 3,551,038 | 12/1970 | Bundschuh et al. | 352—72 |
| 3,362,774 | 1/1968 | Easterly | 352—72 |
| 3,105,645 | 10/1963 | Rost | 242—71.1 |
| 3,467,341 | 9/1969 | Roman | 242—197 |
| 3,517,896 | 6/1970 | Kral | 242—197 |

FOREIGN PATENTS

| 432,236 | 9/1967 | Switzerland | 352—72 |

JOSEPH F. PETERS, Jr., Primary Examiner

U.S. Cl. X.R.

95—31 CA; 206—59 E; 242—71.1, 197; 352—78 C